United States Patent [19]

Marchadour

[11] Patent Number: 4,844,481
[45] Date of Patent: Jul. 4, 1989

[54] CYLINDRICAL SEAL SYSTEM

[76] Inventor: Jean-Charles Marchadour, 7734 Avondale Dr., Salt Lake, Utah 84121

[21] Appl. No.: 177,065

[22] Filed: Apr. 4, 1988

[51] Int. Cl.$^4$ .............................................. F16J 15/18
[52] U.S. Cl. ..................................... 277/73; 277/102; 277/122; 277/154; 277/195
[58] Field of Search .......................... 277/73, 102–104, 277/119–122, 154, 155, 165, 167.3, 179, 186, 193, 195, 198

[56] References Cited

U.S. PATENT DOCUMENTS

| | | | |
|---|---|---|---|
| 1,283,461 | 11/1918 | Berggren | 277/195 |
| 1,842,942 | 1/1932 | Mellor | 277/122 |
| 2,339,319 | 1/1944 | Brightwell | 277/102 X |
| 3,227,462 | 1/1966 | Tamplen | 277/102 X |
| 3,328,040 | 6/1967 | Prichard | 277/73 |
| 3,359,872 | 12/1967 | Foster | 277/154 X |

*Primary Examiner*—Robert S. Ward
*Attorney, Agent, or Firm*—Thorpe, North & Western

[57] ABSTRACT

A cylindrical seal assembly adapted for sliding or rotary movement within a cylindrical chamber comprises first and second body elements having substantially cylindrical shapes. The body elements are secured together with their respective cylindrical sidewalls being coaxially aligned. A cylindrical seal means is mounted between the body elements, such that the seal means makes continuous sliding contact with the cylindrical chamber when the seal assembly is received within the cylindrical chamber.

14 Claims, 2 Drawing Sheets

CYLINDRICAL SEAL SYSTEM

BACKGROUND OF THE INVENTION

This invention relates to cylindrical seal members such as valve plugs, pistons or the like which are received within a cylindrical chamber for sliding or rotary movement within the chamber. In particular, the invention relates to such cylindrical seal members which are provided with a novel seal mechanism for making a fluid seal between the cylindrical member and the chamber.

Apparatus and processes for automatically filling containers such as cans with both food and non-food products have become very sophisticated. Such apparatus and processes are used to fill containers with liquid, semi-liquid, pasty or solid products including both food products such as liver paste, baby foods, jellies, vegetable oil, mustard, sauces, etc., and non-foods such as mineral oil, wax, paints, etc. The apparatus used may take a variety of form, one of the most popular being the so-called rotary piston filler, such as the MR 16, MR 22, and MR 30 units manufactured by Hema International, Inc. of Utah.

Rotary fillers typically include a generally cylindrical hopper made, for example, of stainless steel, a number of filling assemblies spaced apart about the exterior of the hopper, and a container or can conveying system for moving cans into position underneath the filling assemblies to receive product. The filling assemblies each typically includes a vertically disposed cylinder, a valve coupling the lower end of the cylinder to the hopper and operable to either allow material to flow from the hopper into the cylinder or to flow from the cylinder into a can positioned below the valve, and a piston movable in the cylinder to force material from the cylinder into the can. Rotary fillers also typically include a piston support structure for causing the pistons to move upwardly in the cylinders when product is flowing from the hopper into the cylinders, and downwardly when product is being forced from the cylinder into cans. A typical rotary filler is shown and described in U.S. Pat. No. 4,501,622, issued on Feb. 26, 1985 to the inventor of the present invention.

Of particular interest to the present invention are cylindrical seal members which take the form of pistons and valves used in rotary filler apparatus. Although the cylindrical seal members can be used in a variety of diverse applications, the present disclosure will describe the novel seal members in relation to pistons and valves as used in typical rotary filler apparatus. Of course, the invention is not intended to be, nor should it be, construed to be limited to the illustrative disclosure. Instead, the scope of the invention, as set forth in the appended claims, is intended to cover improved cylindrical seal members which can be used in a variety of diverse applications.

Pistons and rotary valves which utilize conventional o-rings as a seal have presented problems, especially in the rotary filler apparatus used in packaging of food. It is difficult to keep food from leaking or escaping behind the o-rings. Multiple o-rings are generally required to alleviate the problems of leakage about the o-rings in both piston and rotary valves and to provide proper sealing of pistons to develop adequate suction when the piston is used to draw food from the hopper to the cylinder prior to discharge of the food into a can positioned beneath the cylinder.

The prior pistons and valves utilizing o-ring seals also present a problem during cleaning. Automatic means have been recently proposed (see U.S. Pat. No. 4,502,622) for cleaning the rotary feeders used in food applications. The o-ring seals on pistons and valves are difficult to clean properly except by hand. The o-rings have to be removed so that the retainer grooves and the o-rings can be adequately cleaned. This is very cumbersome and at least partially obviates the advantages of the automatic cleaning means and methods. The o-rings and grooves, if not cleaned often and thoroughly, collect food and provide an excellent habitat for bacteria growth.

As can be recognized, it is highly desirable to develop an improved cylindrical seal member which can be used in the form of pistons and rotary valves on rotary feeder apparauus. Such cylindrical seal members would eliminate the use of conventional o-rings while being adapted to be easily cleaned with automatic cleaning methods which have been proposed and are now coming into use in the food packaging industry.

SUMMARY OF THE INVENTION

It is a principal object of the present invention to provide an improved cylindrical seal member incorporating a novel seal system which avoids the use of exposed o-rings. Such improved seal members are advantageously utilized in the form of pistons and rotary valves in apparatus used in filling containers with plastic, flowable food materials.

It is a particular object of the present invention to provide an improved cylindrical seal member which includes a sanitary, easily cleaned seal system which need not be removed from the cylindrical seal member during the cleaning operation.

An additional objective of the present invention is to provide an improved cylindrical seal member which incorporates a hydraulic seal system, in which the means for producing pressurized hydraulic fluid and for controlling the pressure on such fluid are self-contained within the cylindrical seal member, and wherein the hydraulic pressure on the seal system can be adjusted such that the hydraulic seal can adapt to variation in sizes of the chamber in which the seal member is positioned.

The above and other objects of the invention are realized in specific illustrative embodiments of seal members which are advantageously utilized as pistons and rotary valves adapted to be positioned within cylindrical chambers for sliding and/or rotational movement within such chambers. In accordance with the invention, the seal members comprise a controlled seal for making a fluid seal between the cylindrical seal members and the chambers in which the seal members are positioned.

The seal members of this invention comprise first and second body elements which have substantially cylindrical shapes. The cylindrical sidewall of the first body element has a diameter such that the first body element is received snugly within the cylindrical chamber. The cylindrical sidewall of the second body element has a diameter which can be less than, but under no circumstances, larger than the diameter of the sidewall of the first body element.

Means are provided for securing the first and second body elements together with their respective cylindrical sidewalls being coaxially aligned. A cylindrical seal ring comprising a band of resilient material is engaged between the first and second body elements. The seal ring has relatively thin, circuitous upper and lower ends, with an enlarged, thickened, circuitous section intermediate the upper and lower ends thereof. The upper and lower ends of the seal ring are sealed securely to the mutually respective first and second body elements, so that the thickened or central section of the seal ring is positioned between the first and second body elements and is adapted to make continuous sliding contact with the cylindrical chamber in which the body elements are received.

A novel sealing system is provided for maintaining the thickened, central section of the seal ring in fluid sealing engagement with the cylindrical chamber. In one preferred embodiment, the sealing system comprises a hydraulic system which is completely self-contained within the cylindrical seal member. An annular channel is formed between the cylindrical seal member and the inwardly facing portion of the central section of the cylindrical seal ring. The annular channel is thus adjacent to and in part formed by the central section of the cylindrical seal ring. Hydraulic fluid is provided within the annular channel to exert an outward force on the central section of the seal ring, and to thereby create an effective fluid seal between the seal ring and the cylindrical chamber.

Hydraulic fluid is supplied to the annular channel from a piston which is positioned within a piston bore. The piston bore is formed entirely within the body elements of the seal member of the invention. An internal duct extends in fluid communication between the piston bore and the annular channel. Means are associated with the piston for exerting a selective force on the piston to develop pressure in the hydraulic fluid.

As mentioned previously, the hydraulic system is totally contained within the seal member of the invention. The only outwardly facing portions of the seal member are the exterior surfaces of the two body elements and the exterior of the seal ring which is otherwise held securely between the two body elements.

The seal member, either in the form of a food metering piston or of a rotary valve, can readily be withdrawn from the chamber in which it is positioned. The seal member is easily cleaned with automatic cleaning systems such as the cleaning system of the U.S. Pat. No. 4,502,622. After cleaning, the seal member is readily and easily reinserted into its working chamber. The seal system of the present invention has been found to be extremely advantageous. The seal system is readily withdrawn and reinserted in the working chamber with the seal member. The seal system makes a positive, sanitary seal which prevents food from leaking or escaping past the seal, and the seal system has been found to have an extensive operating life. The seal system is not only durable, but it is capable of self adjustment in its circumference to adapt to variations in sizes of the working chambers with which it is associated.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
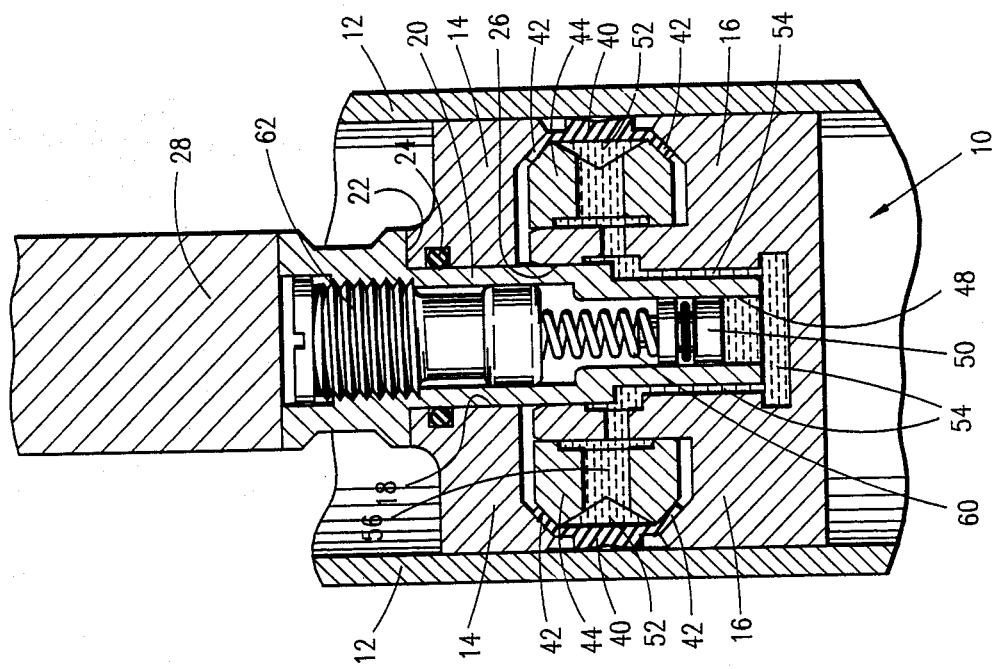
FIG. 1 is a cross-sectional view of a seal member in accordance with the present invention, showing the seal member in the form of a piston positioned within a food measuring and dispensing chamber.
Figure 2:
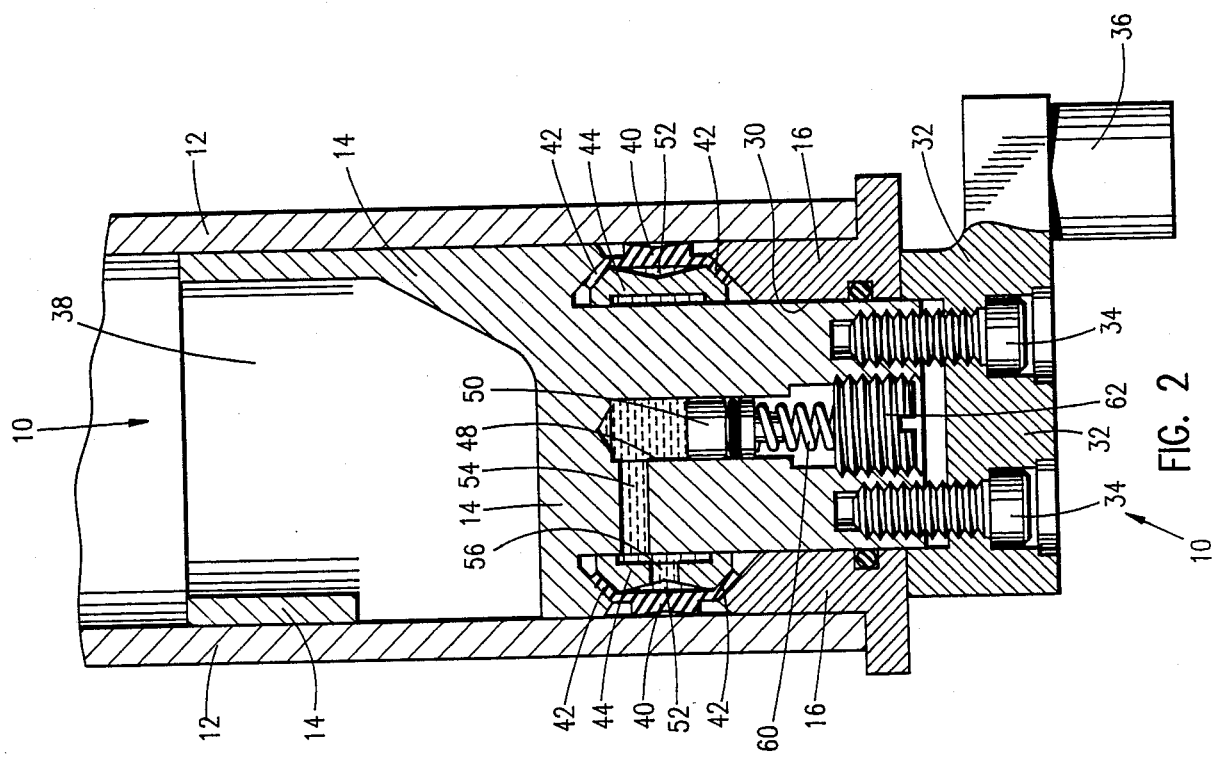
FIG. 2 is a cross-sectional view of another embodiment of a seal member in accordance with the invention showing the seal member in the form of a rotary valve positioned within a valve chamber.

Referring to the drawings, there is shown three closely related embodiments of cylindrical seal members in accordance with the present invention. In FIG. 1 there is shown a cylindrical seal member in the form of a piston which moves back and forth within a delivery and a metering chamber. In FIG. 2 there is shown a rotary valve plug which moves within a valve chamber, and in FIG. 3 there is shown a modified seal member in the form of a piston similar to that of FIG. 1. Like parts in the closely related embodiments, as illustrated, will be identified by identical reference numbers throughout the drawings and this description.

Figure 3:
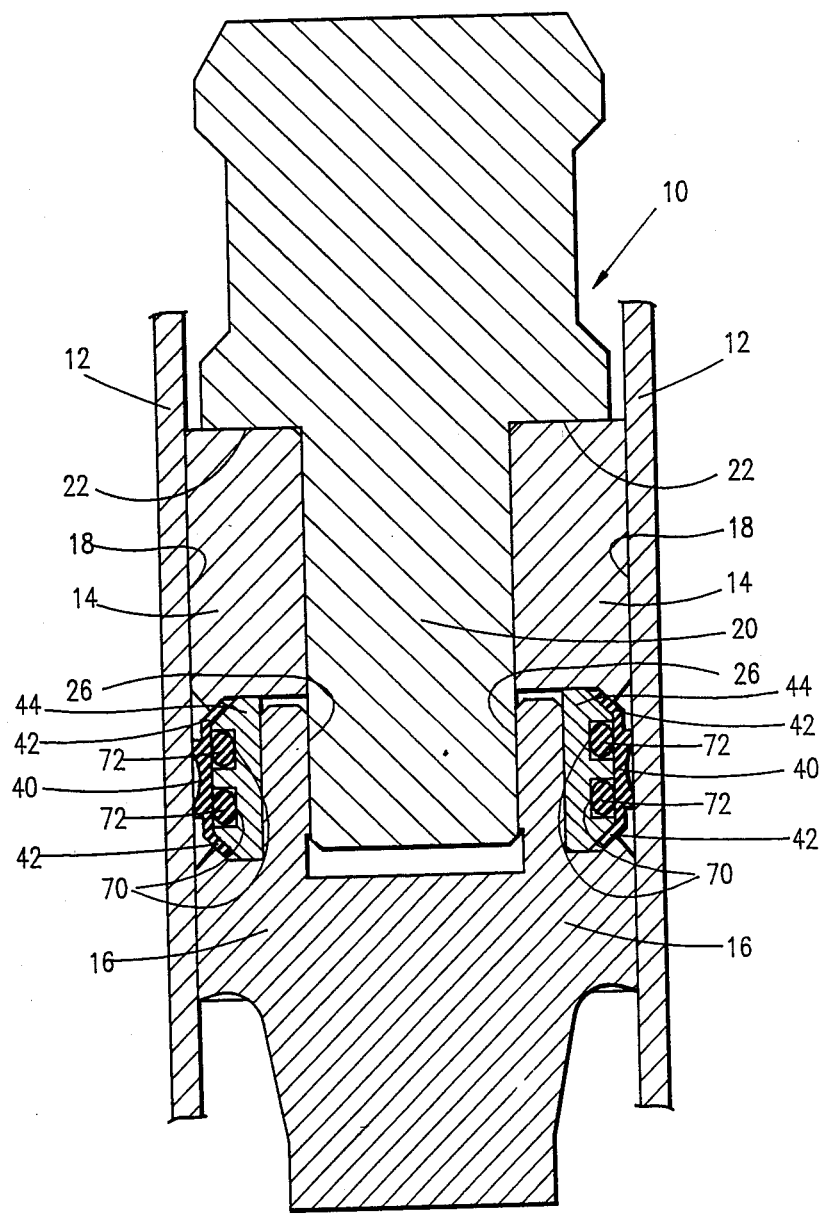
FIG. 3 is a cross-sectional view of a third embodiment of a seal member in accordance with the invention in the form of a piston similar to that of FIG. 1.

The seal member 10 is received snugly within a cylindrical chamber 12 for sliding or rotary movement within the chamber 12. The piston members 10 of FIG. 1 and FIG. 3 are adapted to slide back and forth within the chamber 12, whereas the plug valve member 10 of FIG. 2 is adapted to revolve or rotate within the chamber 12. In all three embodiments as illustrated, the seal members 10, i.e., the pistons 10 of FIGS. 1 and 2 and the valve plug 10 of FIG. 2, comprise first and second body elements 14 and 16. The first body element 14 has a substantially cylindrical shape, with its cylindrical sidewall having a diameter which is received snugly within the cylindrical chamber 12. The second body element 16 has a substantially cylindrical shape, with its cylindrical sidewall having a diameter no greater than the diameter of the cylindrical sidewall of the first body element 14, such that the second body element can be received within the cylindrical chamber 12.

Means are provided for securing the first and second body elements 14 and 16 together with their respective cylindrical sidewalls being coaxially aligned. In the piston embodiment as shown in FIGS. 1 and 3, the first body element 14 has a central opening 18 which extends therethrough, with the central opening 18 being coaxially aligned with the cyclindrical axis of the first body element 14. A cylindrical shaft 20 extends through the central opening 18 in the first body element 14 so that the first body element 14 is supported on the cylindrical shaft 20. The upper end of the cylindrical shaft 20 is advantageously enlarged and provided with a shoulder abutment 22. When the first body element 14 is properly supported on the cylindrical shaft 20, the upper end of the first body element 14 abuts firmly against the shoulder abutment 22 on the cylindrical shaft 20. Frictional engagement between the cylindrical shaft 20 and the opening 18 in the first body element 14 retains the first body element 14 in its proper position. An o-ring seal 24 can be provided between the opening 18 and the cylindrical shaft 20 as shown in FIG. 1 if desired.

The second body element 16 of the piston embodiment shown in FIGS. 1 and 3, has a central well 26 extending into the second body element 16 from one end thereof. The well 26 is coaxially aligned with the cylindrical axis of the second body element 16. The well 26 of the second body element 16 is received over the end of the cylindrical shaft 20 which extends downwardly from the central opening 18 in the first body element 14 when the first body element 14 is properly positioned on the cylindrical shaft 20. The second body element 16 is retained in position on the cylindrical shaft 20 by frictional engagement between the shaft 20 and the well 26 in the second body element 16. When properly positioned on the shaft 20, the second body element 16 is secured adjacent to and in alignment with the first body element 14, and the two body elements 14 and 16 are held together with the cylindrical shaft 20 as the unitary piston member 10. An upper shaft 28 (FIG. 1) is adapted to push downwardly on the enlarged end of the cylindrical shaft 20 to effectively displace the piston member 10 within the chamber 12. Generally, when being used as a metering and discharge piston on rotary feeders in the food industry, the shaft 28 simply abuts the end of cylindrical shaft 20. When the shaft 28 is raised, pressure from incoming food material acts to raise the piston member 10. When the shaft 28 is lowered, the piston member 10 moves downwardly to discharge food material from the chamber 12. It is recognized, of course, that in some applications it may be advisable to provide a means for firmly attaching the upper shaft 28 to the end of the cylindrical shaft 20 such that the upward movement of the upper shaft 28 would also, in a positive manner, move the piston member 10 upwardly. Attachment means for attaching the upper shaft 28 to the cylindrical shaft 20, if such attachment is desired, is well within the skill of the art and is thus not illustrated in the drawings.

In the rotary valve plug embodiment as illustrated in FIG. 2, the first and second body elements 14 and 16 are held together in a similar but somewhat modified manner. Instead of relying upon a central cylindrical shaft upon which to mount the body elements as described above with respect to the piston embodiment of FIG. 1, the first body element 14 of the valve plug embodiment as illustrated in FIG. 2 is adapted to engage and hold the second body element 14. To this end, the first body element 14 of the valve plug embodiment comprises an inner end portion and an outer end portion, with the inner end portion having a diameter such that the inner end portion is received snugly within the cylindrical valve chamber 12. The outer end portion has a reduced diameter and in effect forms a cylindrical shaft extending from the inner end portion. The second body element 14, as illustrated in FIG. 2, has a central cylindrical cavity or opening 30 extending therethrough with the diameter of the cylindrical opening 30 being of such a size that the outer end portion of the first body element 14 is snugly received coaxially within the cylindrical opening 30. The second body element 16 is thus mounted on and supported by the first body element 14.

Although the second body element 16 of the plug valve embodiment of FIG. 2 could be retained on the outer portion of the first body element 14 by frictional engagement therewith, it is advantageous to provide a drive and cap member 32 which will act to retain the first and second body members as a unitary unit as well as to drive the plug member 10 in a rotary motion within the chamber 12. The drive and cap member 32 is attached to the otherwise free end of the outer end portion of the first body element 14 by means of bolts 34 which are threaded into threaded bores in the first body element 14. The cap and drive member 32 forces the second body element 16 onto the outer portion of the first body member and retains the two body members 14 and 16 and the cap and drive member 32 together in the form of the unitary plug member 10. The cap and drive member 32 as illustrated also has a cam roller 36 which is adapted to follow a cam operator mechanism which is not shown in the drawings. Rotational driving of the valve plug member 10 is achieved through the action of the cam operator mechanism upon the cam roller 36. As also shown in FIG. 2, the first body element 14 has a right angle opening 38 extending from the cylindrical sidewall of that element 14 to the open end. By proper rotational operation of the valve plug member 10, the opening in the cylindrical sidewall of the first body element 14 can be brought into selective alignment with one or more mutually respective openings in the sidewall of the chamber 12. These latter openings are not shown in the drawings.

In all three of the embodiments shown in the drawings, a cylindrical seal ring 40 is provided along with means for engaging the seal ring 40 between the first and second body elements 14 and 16. The cylindrical seal ring 40 has relatively thin circuitous upper and lower ends 42 with an enlarged, thickened, circuitous section intermediate the upper and lower ends 42. As shown in the drawings, the lead lines for the number 40, which refer to the seal ring in general, terminate in the enlarged thickened section intermediate the ends 42 of the seal ring 40. The seal ring 40 is secured between the body elements 14 and 16 such that the enlarged, thickened section of the seal ring 40 makes a continuous sliding contact with the cylindrical chamber 12 when the seal member 10 is received within the chamber 12. The seal ring 40 can be made of any resilient material which is commonly used for seal rings, o-rings and the like.

As stated previously, means are provided for engaging the cylindrical seal member or ring 40 between the first and second body members 14 and 16. To that end, an annular recess is formed in the seal member 10 between the second body element 16 and the cylindrical sidewall of the first body element 14. For the piston embodiments illustrated in FIGS. 1 and 2, the annular recess is formed in the second body element 16 at the juncture between the second body element 16 and the cylindrical sidewall of the first body element 14. For the valve plug embodiment of FIG. 2, the annular recess is formed by a space between the cylindrical sidewall section of the inner portion of body element 14 and the inner end of the second body element 16. The annular recess in the latter situation is thus defined by the facing ends of the second body element 16 and the cylindrical inner portion of the first body element 14.

In all three of the embodiments illustrated in the drawings, an annular, inner bushing ring 44 is received in the annular recess between the first and second body elements 14 and 16 of the respective seal member 10. As illustrated, the annular bushing ring 44 is advantageously used to lock the seal ring 40 in place between the two body elements 14 and 16. One of the ends 42 of the seal ring 40 is clamped between the bushing ring 44 and the first body element 14, with the other end 42 of the seal ring 40 being clamped between the bushing ring 44 and the second body element 16. For purposes of creating a strong clamping engagement of the ends 42 of the seal ring 40, the sides of the annular recess and the mutually respective ends of the annular bushing ring can be beveled as shown in the drawings.

In the embodiments shown in FIGS. 1 and 2, a novel hydraulic system is provided for applying a uniform hydraulic force to the inner side of the thickened section of the seal ring 40 to effect a positive seal between the outer side of the seal ring 40 and the chamber 12. The hydraulic system is self-contained within the seal member 10, along with means for controlling the hydraulic system. A piston bore 48 is located within the cylindrical seal member 10, and a piston 50 is positioned within the piston bore 48 for sliding movement therein. An annular channel 52 is formed between the cylindrical seal member 10 and the inwardly facing portion of the cylindrical seal ring 40, such that the annular channel 52 is adjacent to and in part formed by the enlarged, thickened, circuitous section of the cylindrical seal ring 40. An integral duct 54 is formed within the cylindrical seal member 10 so that the duct 54 extends in fluid communication between the piston bore 48 and the annular channel 52. Hydraulic fluid fills the annular channel 52, the internal duct 54 and the piston bore 48 downstream from the piston 50. Means are provided for exerting a force on the piston to develop pressure in the hydraulic fluid, and that pressure is communicated uniformly to the inwardly facing portion of the cylindrical seal ring 40.

As shown in FIGS. 1 and 2 of the drawings, the annular channel 52 is formed by an annular space between the outer periphery of the bushing ring 44 and the enlarged, thickened, circuitous section of the seal ring 40. Advantageously, a shallow, v-shaped, peripheral indentation is formed in the bushing ring 44 to create the space between the bushing ring 44 and the seal ring 40. An opening 56 is provided through the bushing ring 40 to the internal duct 54.

As illustrated in FIG. 1, the piston bore 48 is formed in the portion of the cylindrical shaft 20 upon which the first and second body elements 14 and 16 are mounted. The internal duct 54 is formed in part by the lower portion of the well 26 of the second body element 16. The lower end portion of the shaft 20 is undercut to form an annulus extending along the undercut side of the shaft 20. This annulus also forms part of the duct 54. An opening extending from the annulus to the recess for the bushing 44 completes the duct 54. The means for exerting a force on the piston 50 advantageously comprises a coil spring 60 located in a central bore through the shaft 20 and above the piston 50. A threaded plunger member 62 is engaged in the threaded upper portion of the central bore in the shaft 20. The force on the piston 50 can be adjusted by threading the plunger 62 inwardly or outwardly to increase or decrease the tension of the coil spring 60. By increasing the tension of the coil spring 60, the effective pressure in the hydraulic fluid is increased, and the hydraulic seal of the invention can thus be adjusted to wear and tear on the chambers 12 or to a wide variation in tolerances in the manufacturing of the chambers 12.

In the valve plug embodiment of FIG. 2, the piston bore 48 is formed in the outer portion of the first body element 14. The internal duct 54 extends directly from the inner end of the piston bore 48 through the first body element 14 to the opening 56 in the bushing ring 44. The means for exerting a force on the piston 50 advantageously comprises a coil spring 60 located in the bore 48. A threaded plunger member 62 is engaged in the threaded outer portion of the bore 48. The force on the piston 50 can be adjusted by threading the plunger 62 inwardly or outwardly to increase or decrease the tension of the coil spring 60.

In the embodiment shown in FIG. 3, a mechanical means is provided for applying a uniform force to the inner side of the thickened section of the seal ring 40 to effect a positive seal between the outer side of the seal ring 40 and the chamber 12. The mechanical seal means comprises at least one circumferential groove 70 (two such grooves are illustrated in FIG. 3) in the outer face of the bushing ring 44. A respective circuitous, resilient bushing member 72 is positioned in each of the grooves 70 in the bushing ring 44 such that the bushing member 72 makes resilient, supporting contact with the inner face of the enlarged, thickened, circuitous section intermediate the upper and lower ends 42 of the cylindrical seal ring 40. The resilient bushing member 72 is advantageously an o-ring made of an elastomeric material.

It is to be understood that the above-described arrangements are only illustrative of the application of the principles of the present invention. Numerous modifications and alternative arrangement may be devised by those skilled in the art without departing from the spirit and scope of the present invention and the appended claims are intended to cover such modifications and arrangements.

I claim:

1. A cylindrical seal assembly to be received for sliding or rotary movement within a cylindrical chamber, said cylindrical seal assembly comprising a first body element having a substantially cylindrical shape, with its cylindrical sidewall having a diameter such that said first body element is received snugly within said cylindrical chamber;

a second body element having a substantially cylindrical shape, with its cylindrical sidewall having a diameter no greater than the diameter of the cylindrical sidewall of said first body element;

means for securing said first and second body elements together with their respective cylindrical sidewalls being coaxially aligned;

a cylindrical seal ring comprising a band of resilient material having circuitous upper and lower ends and a circuitous midsection intermediate the upper and lower ends thereof; and means for engaging the cylindrical seal ring between said first and second body elements when said first and second body elements are secured together, such that the midsection of said seal ring makes continuous sliding contact with said cylindrical chamber when said cylindrical seal assembly is received within said cylindrical chamber;

wherein the means for engaging the cylindrical seal ring between said first and second body elements comprises an annular recess in the cylindrical seal assembly between the second body element and the cylindrical sidewall of said first body element;

an annular, inner, bushing ring received in said annular recess;

means for retaining and sealing the circuitous upper end of said cylindrical seal ring between said bushing ring and one of the first and second body members;

means for retaining and sealing the circuitous lower end of said cylindrical seal ring between said bushing ring and the other of the first and second body members;

at least one circumferential groove in the outer face of said bushing ring; and a circuitous, resilient bushing member positioned within said groove in said bushing ring such that the bushing member makes resilient, supporting contact with the inner face of the midsection of said cylindrical seal ring.

2. A cylindrical seal assembly in accordance with claim 1, wherein the resilient bushing member is an o-ring made of an elastomeric material.

3. A cylindrical seal assembly in accodance with claim 2, wherein two spaced circumferential grooves are provided in the outer face of said bushing ring, and a respective o-ring is positioned in each of said grooves.

4. A cylindrical seal assembly to be received for sliding or rotary movement within a cylindrical chamber, said cylindrical seal assembly comprising
a first body element having a substantially cylindrical shape, with its cylindrical sidewall having a diameter such that said first body element is received snugly within said cylindrical chamber;
a second body element having a substantially cylindrical shape, with its cylindrical sidewall having a diameter no greater than the diameter of the cylindrical sidewall of said first body element;
means for securing said first and second body elements together with their respective cylindrical sidewalls being coaxially aligned;
a cylindrical seal ring comprising a band of resilient material having circuitous upper and lower ends and a circuitous midsection intermediate the upper and lower ends thereof; and
means for engaging the cylindrical seal ring between said first and second body elements when said first and second body elements are secured together, such that the midsection of said seal ring makes continuous sliding contact with said cylindrical chamber when said cylindrical seal assembly is received within said cylindrical chamber;
a piston bore located internally within said cylindrical seal assembly;
a piston positioned within said piston bore for sliding movement therein;
an annular channel formed between said cylindrical seal assembly and the inwardly facing portion of said cylindrical seal ring, whereby said annular channel is adjacent to and in part formed by the midsection of said cylindrical seal ring;
an internal duct formed within said cylindrical seal assembly so that said duct extends in fluid communication between said piston bore and said annular channel;
hydraulic fluid contained in said annular channel, said internal duct and said piston bore; and
means for exerting a force on said piston to develop pressure in said hydraulic fluid, whereby said pressure is communicated uniformly to said inwardly facing portion of the midsection of said cylindrical seal ring.

5. A cylindrical seal assembly in accordance with claim 4, wherein the means for engaging the cylindrical seal ring between said first and second body elements comprises
an annular recess in the cylindrical seal assembly between the second body element and the cylindrical sidewall of said first body element;
an annular, inner, bushing ring received in said annular recess;
means for retaining and sealing the circuitous upper end of said cylindrical seal ring between said bushing ring and one of the first and second body members;
means for retaining and sealing the circuitous lower end of said cylindrical seal ring between said bushing ring and the other of the first and second body members; and further wherein
said annular channel is created by an annular space formed between the outer periphery of said bushing ring and the midsection of said cylindrical seal ring; and
an opening is provided through said bushing ring, said opening extending between said internal duct in said cylindrical seal assembly and said annular channel.

6. A cylindrical seal assembly in accordance with claim 4, wherein the means for exerting a force on said piston can be adjusted to increase or decrease said force so as to thereby increase or decrease the pressure in said hydraulic fluid.

7. A cylindrical seal assembly in accordance with claim 4 wherein
said first body element has a central opening extending therethrough, said central opening being coaxially aligned with the cylindrical axis of said first body element;
a cylindrical shaft extends through the central opening in said first body element, such that said first body element is supported on said cylindrical shaft;
said second body element has a central well extending from one end thereof, said central well being coaxially aligned with the cylindrical axis of said second body element, with said well of said second body element being received over one of the ends of said cylindrical shaft which extends from the central opening in said first body element such that said second body element is supported on said cylindrical shaft adjacent to said first body element;
said piston bore is formed in the portion of said cylindrical shaft which extends through said first and second body elements; and
said internal duct is formed in part between the inward end portion of said well and the portion of said cylindrical shaft therein.

8. A cylindrical seal assembly in accordance with claim 7, wherein the means for engaging the cylindrical seal ring between said first and second body elements comprises
an annular recess in the second body element at the juncture between the second body element and the cylindrical sidewall of said first body element;
an annular, inner, bushing ring received in said annular recess;
means for retaining and sealing the circuitous upper end of said cylindrical seal ring between said bushing ring and one of the first and second body members;
means for retaining and sealing the circuitous lower end of said cylindrical seal ring between said bushing ring and the other of the first and second body members; and further wherein
said annular channel is created by an annular space formed between the outer periphery of said bushing ring and the midsection of said cylindrical seal ring; and
an opening is provided through said bushing ring, said opening extending between said internal duct in said cylindrical seal assembly and said annular channel.

9. A cylindrical seal assembly in accordance with claim 8, wherein the means for exerting a force on said piston can be adjusted to increase or decrease said force so as to thereby increase or decrease the pressure in said hydraulic fluid.

10. A cylindrical seal assembly in accordance with claim 4, wherein said first body element comprises an inner end portion and an outer end portion, with the inner end portion having a diameter such that the inner end portion is received snugly within said cylindrical chamber and the outer end portion having a reduced diameter; and said second body element has a central cylindrical cavity being coaxially aligned with the cylindrical axis of said second body element, with the diameter of said cylindrical cavity being of a size that the outer end portion of said first body element is snugly received coaxially within said cylindrical cavity whereby said second body element is mounted on and supported by said first body element.

11. A cylindrical seal assembly in accordance with claim 10, wherein a drive member is attached to the otherwise free end of the outer end portion of the first body element, said drive member acting to secure said second body element in position upon the outer end portion of the first body member, said drive member also acting as means to move the cylindrical seal member in sliding movement within said chamber in which the cylindrical seal assembly is positioned.

12. A cylindrical seal assembly in accordance with claim 11, wherein the means for engaging the cylindrical seal ring between said first and second body elements comprise an annular recess in the cylindrical seal assembly between the second body element and the inner portion of said first body element;

an annular, inner bushing ring received in said annular recess;

means for retaining and sealing the circuitous upper end of said cylindrical seal ring between said bushing ring and one of the first and second body members;

means for retaining and sealing the circuitous upper end of said cylindrical seal ring between said bushing ring and the other of the first and second body members; and further wherein said annular channel is created by an annular space formed between the outer periphery of said bushing ring and the midsection of said cylindrical seal ring; and an opening is provided through said bushing ring, said opening extending between said internal duct in said cylindrical seal assembly and said annular channel.

13. A cylindrical seal assembly in accordance with claim 12, wherein the means for exerting a force on said piston can be adjusted to increase or decrease said force so as to thereby increase or decrease the pressure in said hydraulic fluid.

14. A cylindrical seal assembly in accordance with claim 13, wherein said piston bore is formed in the first body element.

* * * * *